May 15, 1951  A. B. VON ADELUNG  2,553,021

SPRING MOUNTED MEANS

Filed Aug. 6, 1947

INVENTOR.
ARCHIBALD B. VON ADELUNG
BY

Patented May 15, 1951

2,553,021

UNITED STATES PATENT OFFICE 2,553,021

SPRING MOUNTED MEANS

Archibald B. von Adelung, Berkeley, Calif.

Application August 6, 1947, Serial No. 766,850

2 Claims. (Cl. 267—60)

This invention relates to means whereby a coiled spring or the like may be secured in place relative to a member with which the spring is concentrically arranged.

An object of the invention is to provide spring mounting means for devices of the nature referred to in which the retention is effected without extraneous parts other than the spring and its associated member.

Another object of the invention is to provide retaining means for a coiled spring which may be produced in a turned or bored part, to be subsequently associated with the spring, by the simple application of a formed turning or boring tool to a surface of the part while the latter is being formed.

A further object of the invention is to provide spring mounting means of the character described which will greatly speed up assembly operations of devices employing springs having anchored ends and will greatly lessen part rejection due to improperly mounted springs or faulty assembly in which a displaced spring may interfere with the proper relative positioning of parts of the assembly.

Still another object of the invention is to provide spring anchoring means which may be incorporated in any device, to which its use is suited, at insignificant cost.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing.

Figure 1:
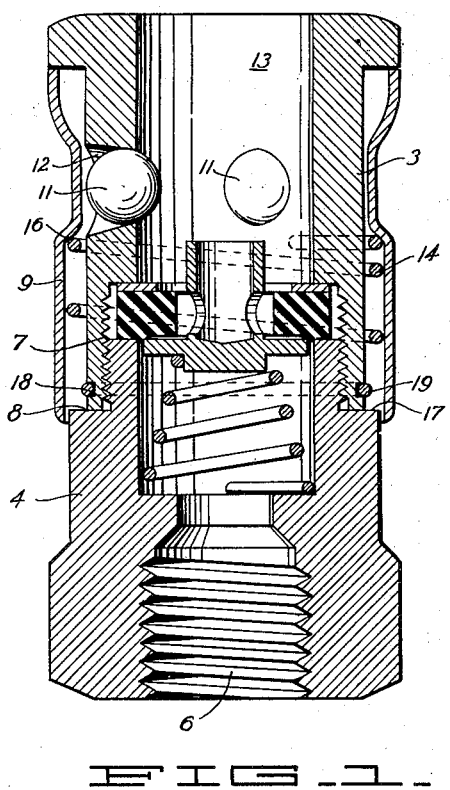
Figure 1 is a vertical sectional view of the socket section of a separable hose connector with which I have chosen to illustrate my invention and in which the latter is incorporated.
Figure 2:
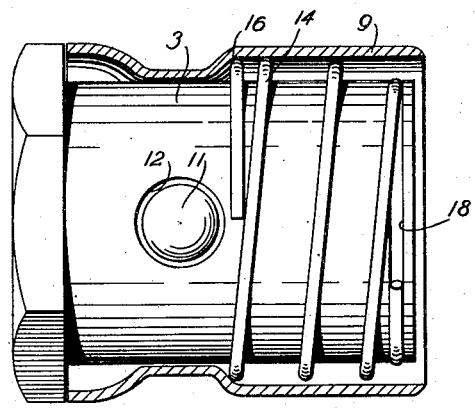
Figure 2 is a view partly in side elevation and partly in vertical section showing the socket member of the coupling with the spring anchored thereto.

Although the improvement of my invention may be employed in various arrangements wherein a coiled spring is to be anchored to a cooperative part, I have shown, for purposes of illustration, a coupling member of the quick-acting release type commonly used for joining sections of air hose or other fluid-handling conduit. The average coupling of this character comprises a cylindrical sleeve or socket member 3 coaxially related with and abutting an extension body 4 provided with threaded attachment means 6 for connection with a supply conduit. The junction of the member 3 and body 4, usually effected by mating coaxial screw threads 7, forms a peripheral interstice 8 which may be overlayed and obscured by a sliding sleeve 9 constituting the actuating element for the releasable lock in this case shown as a plurality of balls 11 operative in apertures 12 positioned axially radial with respect to socket 13 of the member 3 and movable, under the influence of the sleeve 9 to grip or release a coupling member complementary with and which may be inserted in the socket 13. A coiled spring 14, provided for yieldably maintaining the sleeve 9 in position so as to preserve locking engagement of the balls 11 with the aforesaid coupling member disposed in the socket 13, is commonly interposed in concentric relation with the member 3 and is interposed between an internal shoulder 16 formed in the latter member and with a radially extended shoulder 17 formed on the body 4 and coinciding with the peripheral interstice 8 marking the junction between the body and socket member. It will be seen in Figure 1 that during the process of assembly of the coupling member, both the interstice 8 and the adjacent end of the spring 14 cannot be seen by the assembler and it frequently occurs that some portion of the end coil of the spring will accidently move into the closing gap between the shoulder 17 and the confronting end of the socket member and become pinched therein so that complete abutting of the members 3 and 4 cannot be secured. In many instances coupling members which have apparently been cinched tight in assembly are innocently allowed to pass into trade channels and are subsequently returned for replacement or repair.

I have provided a simple means of anchoring the end portion of a coiled spring to a concentric member which is particularly effective in overcoming the assembly difficulty described above. I accomplish this by providing in the part over which the spring telescopes, in this case the socket member 3, a peripheral groove 18 spaced slightly away from the end of the member which is to be brought into abutting relation with the shoulder 17 or the like so as to provide a radial abutment and I radially deform the end coil 19 of the spring by compressing its diameter so that the latter will snap into and be retained by its own radial tension in the groove. The depth of the groove 18 need only be very slight, a dimension of about one-fourth of the diameter of the spring wire having been found to give satisfactory results. This latter dimension is sufficient to anchor the spring end during normal assembly operations so as to insure that the threadedly engaged parts of the coupling are brought into proper and tight contact and whether or not the grip of the spring in the groove 18 releases during subsequent operation of the coupling is immaterial since the original interengagement will have served its purpose. Of course, if the anchoring of the spring end is to be made permanent it may be necessary, depending upon the operational stresses imposed on the spring, to slightly deepen the groove. It will be obvious also that although I have shown the spring and its anchoring means incorporated in an assembly of parts the particular invention may be employed in any situation wherein a spring and an aligned part are in concentric relationship. It will also be evident that the invention may be applied in arrangements wherein the spring is to be retained in a bore rather than on a cylindrical object as illustrated. In this regard it will be seen that the securing of springs in the manner above described does not add to the production cost of a part in an amount worthy of mention since the slight deformation of the spring may be easily accomplished during the course of its manufacture and the provision of the anchoring grooves comprises nothing more than a slight touch of a tool during the normal turning or boring operations necessary in the production of the coupling parts.

I claim:

1. Mounting means for a coiled spring on a member having a cylindrical surface extending beyond the respective ends of said spring and for anchoring an end of said spring in spaced relation to an end surface of said member when said spring is under compressive stress tending to move the end of the spring adjacent said end surface of the member toward and beyond said end surface, comprising means spaced from said end surface and including a peripherial groove forming an abutment interposed between the latter surface and said adjacent end of the spring and disposed substantially normally with respect to the longitudinal axis of said member, and a portion of an end coil of said spring stressed to snap radially into position lying against said abutment when said end coil is brought into relative registry with said abutment.

2. Mounting means for holding an end of a coiled spring under compressive stress on a first cylindrical member to preclude movement of said end of the spring toward and into a circumferential gap closable when a second cylindrical member is brought into axially abutting relation with the first cylindrical member, comprising means on said first cylindrical member including a radial groove spaced from said closable gap and lying below the peripheral surface of the first cylindrical member, and a radially deformed portion of an end coil of said spring arranged to snap into position in said groove when said end coil is brought into relative registry with said spring mounting means.

ARCHIBALD B. von ADELUNG.

REFERENCES CITED

The following references are of record in the file of this patent:

UNITED STATES PATENTS

| Number | Name | Date |
|---|---|---|
| 1,486,295 | Mullen | Mar. 11, 1924 |
| 1,541,909 | Early | June 16, 1925 |
| 2,112,293 | Krom et al. | Mar. 29, 1938 |
| 2,322,877 | Parker | June 29, 1943 |
| 2,327,611 | Scheiwer | Aug. 24, 1943 |

FOREIGN PATENTS

| Number | Country | Date |
|---|---|---|
| 326,944 | Great Britain | Mar. 27, 1930 |
| 380,121 | Italy | Apr. 23, 1940 |